March 10, 1964  J. L. MASON  3,124,335
GREASELESS VACUUM-TIGHT VALVE
Filed Oct. 9, 1961
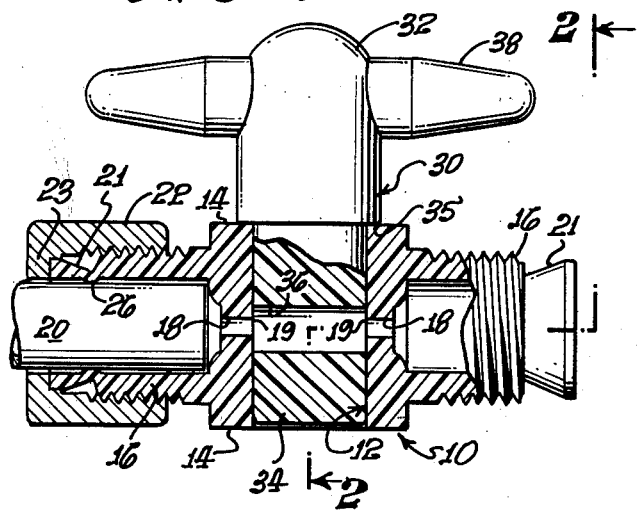
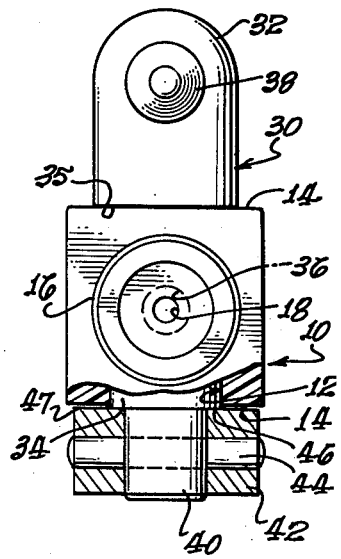
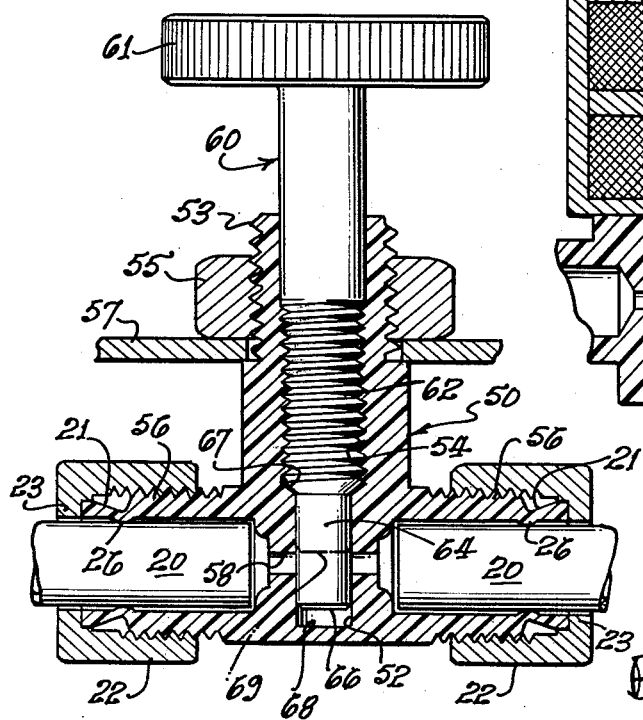
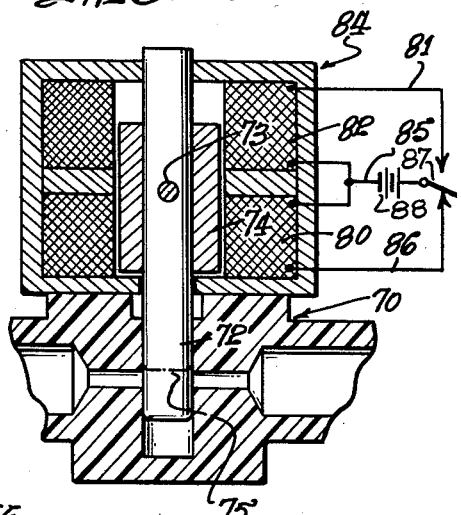
JIMMIE L. MASON,
INVENTOR.
BY United States Patent Office 3,124,335
Patented Mar. 10, 1964

3,124,335
GREASELESS VACUUM-TIGHT VALVE
Jimmie L. Mason, San Gabriel, Calif., assignor to
Mace, a corporation of California
Filed Oct. 9, 1961, Ser. No. 143,866
4 Claims. (Cl. 251—214)

This invention provides a novel valve structure that is particularly suitable for controlling the flow of liquids and gases in laboratory chemical systems and the like. The valves of the invention are usable in high vacuum systems, require no grease or other lubricant, and are capable of handling highly corrosive fluids without danger of leakage or contamination.

Chemical systems at present ordinarily use glass tubing and glass stopcocks, which require a lubricant to make them fluid tight and to prevent the conical plug from becoming jammed in the matching conical bore of the valve body. Such lubricant is attacked by many chemical reagents and is a potential source of contamination in high vacuum systems. Such difficulties are only partially avoided by substitution of other materials for glass in one or both of the elements of conventional stopcocks. In particular, the conical form of plug typically requires a special resilient means for retaining the plug in position.

Previous efforts to produce a satisfactory stopcock with cylindrical bore and plug have not been successful. At best, such valves still required use of a lubricant in contact with the working fluid.

I have now discovered that it is possible to produce a stopcock that is accurately fluid tight, easy to manipulate and highly reliable in operation, yet requires no lubricant whatever. This is the more remarkable, since the plug and bore of my improved valve structure are strictly cylindrical, with zero conical angle. More exactly, both the bore wall and the plug are of right circular cylindrical form. It would ordinarily be expected, with zero conical angle, that the plug would not be tight if smaller than the bore; that precise equality of diameter between the plug and bore would be impossible to fabricate on a commercial scale; and that, if the plug were larger than the bore, it could not be inserted and, if inserted, it could not be moved freely enough to permit convenient operation of the valve.

I have discovered, however, that these apparent obstacles can be entirely overcome. I have found that when both the body and the plug or stem of the valve are made of solid polymerized tetrafluoroethylene, or a material having closely similar physical and chemical properties, there actually exists a definite relationship between the diameters of the cylindrical plug and bore such that the plug can be inserted in the bore and readily manipulated by hand and yet will maintain a fluid tight seal between their opposing surfaces. Moreover the relationship of diameters required to produce that action has been found to involve a degree of precision that careful machining techniques can just reasonably meet in actual practice.

An illustrative valve of stopcock type in accordance with the invention is represented in FIGS. 1 and 2. The valve body 10 comprises a substantially square block of solid material with a right circular cylindrical through bore 12 between its end faces 14 and with integral conduit formations 16 on two of its opposite side faces. The bore 12 communicates with the interiors of the conduit formations via the respective relatively small transverse passages 18 which open into main bore 12 at spaced, diametrically opposite mouths 19.

Means of any desired type are provided for connecting conduit formations 16 to glass tubes or other types of chemical apparatus. The preferred form of connecting fitting shown in the drawings provides a convenient fluid tight seal to a glass tube 20 inserted in the open end of conduit 16. That fitting comprises an external circumferential channel 21 of unsymmetrical V-form closely adjacent the end of conduit formation 16; and a clamping nut 22 threaded on the exterior of formation 16 and having an internal flange 23 adapted to compress the end of formation 16 axially inward. When the described structure is accurately formed of suitable material, such as will be described, that axial compressing action deflects a bead of material radially inward adjacent the vertex of channel 21, forming a remarkably reliable and effective seal with a tube or the like, as indicated at 26. That type of fitting is more fully described and is claimed in my copending patent application, Serial No. 28,729 filed on May 12, 1960, now Patent 3,108,827 under the title "Tube Fitting."

The valve operating member or plug is shown illustratively at 30, with hub portion 32 and cylindrical stem 34. Stem 34 is of right circular cylindrical form and is coaxially received in bore 12 of the valve body in a manner to be more fully described. The shoulder 35 of hub 32 preferably limits the depth of insertion of the stem and defines its normal axial position. A transverse bore 36 through stem 34 is so placed as to form a direct communication between the passages 18 when the plug is fully inserted in either one of two opposite angular positions, as shown. Hub 32 may be provided with a convenient handle, shown as the fixed transverse pin 38, for manual rotation or axial withdrawal of the plug. When the plug is rotated 90° from the position illustrated, passages 18 are isolated from each other by the solid portion of stem 34, closing the valve.

Passages 18 and their associated connection formations 16 may be arranged in many different configurations, as in the familiar glass stopcock structures. For example, the two passages 18 may be axially offset, passage 36 in the plug being correspondingly oblique. Also, three or more passages 18 may be provided at mutually spaced positions, with suitable passage structure within the plug to provide the desired types of interconnection in respective positions of the plug. In the present embodiment plug passage 36 is of larger diameter than passages 18, but that is not necessary.

Important aspects of the present invention concern the material of the two primary valve parts and the relative dimensions of the bore 12 and the plug stem 34. Both parts of the valve are preferably made of solid polymerized tetrafluoroethylene, which is commonly known by the trade name "Teflon." Other materials having essentially the same physical and chemical properties may also be used. An illustrative alternative material, which has essentially the same physical and chemical properties as Teflon, is trifluoromonochloroethylene, commonly known by the trade name "Kel-F." Such materials are extremely inert chemically. They are sufficiently hard and rigid to be conveniently and accurately machined. They exhibit a limited resilience, changing shape somewhat under pressure and returning substantially fully to their original shape when the pressure is removed. Moreover, the described substances have remarkably low coefficient of friction, both with relation to other substances and relative to another piece of the same material. All of those unusual properties are well known, and are peculiarly well adapted to the present use. However, it has not been possible from a knowledge of those properties to predict that the present type of valve would operate satisfactorily if made to any definable tolerances; nor could it be said whether it would be feasible to produce parts with the required accuracy.

I have discovered, however, that materials of the described type permit the production of an effective and convenient valve when the diameter of the stem is greater than that of the bore in the body by a definite but extremely small amount. The optimum value of that difference of diameters has been found to be approximately 0.0003 inch. If that difference is appreciably less than 0.0002 inch, there is a possibility that the valve will not be completely fluid tight; and if the excess appreciably exceeds 0.0006, the plug becomes inconveniently difficult to manipulate manually. If the defined difference of diameters appreciably exceeds 0.0015 inch operation of the valve is ordinarily entirely impractical. One remarkable aspect of the present discovery is the fact that absolute precision is not necessary, but that there is an appreciable working range, namely from about 0.0002 to about 0.0006 inclusive, in which valves of the described structure are extremely satisfactory and convenient in use. I have found in practice that if the parts are machined with good workmanship and equipment and with careful attention to accuracy of dimension and smoothness of surface the required precision is readily obtainable.

I have further discovered that the same excess of stem diameter over bore diameter defined above applies for a wide range of valve sizes. Valves of the described structure can be made successfully over the entire range of plug sizes from a diameter of about 3/16 inch to 1½ inches or more, using the same absolute value of the defined excess.

The valve plug is assembled in the valve body entirely dry and free of any added lubricant whatever. That feature of the invention provides the great advantage that the working fluid in the valve comes in contact with no foreign matter whatever other than the material of which the two primary valve members are fabricated. There is no lubricant to contaminate a high vacuum system or to react chemically even with the most highly reactive working fluids.

The valve structure of FIG. 1 has the particular advantage that it can be disassembled immediately, if that is desired for any reason, simply by removing the plug member; yet there is no tendency for the plug member to become displaced axially in normal use. Neither vacuum nor superatmospheric pressure within the working passages of the valve can produce a force component tending to move the valve plug axially, as frequently happens with conventional tapered stopcocks.

However, it may sometimes be desired to provide a positive lock to prevent accidental axial displacement of the valve plug, particularly in valves that are to be operated frequently by personnel not accustomed to handling ordinary stopcocks. Such a locking structure is shown in illustrative form in FIG. 2, and comprises a coaxial stem extension 40 of reduced diameter outside the valve body 10; a collar 42, preferably of the same material as the valve plug; and means for releasably retaining the collar on the stem, shown as a cylindrical pin 44 which is received with an easy press fit in a diametral bore. The shoulder 46 between stem extension 40 and the main portion of the plug stem 34 is preferably so positioned as to provide slight clearance at 47 between the collar and the lower face of valve body 10. That clearance is exaggerated in the drawing for clarity of illustration. With that structure the valve can be disassembled by first manually pressing out pin 44 and removing the retaining collar. Both the retaining structure and its operation are appreciably simpler than would be required in a stopcock valve of conventional conical form.

FIG. 3 represents in axial section an illustrative embodiment of the invention wherein the valve stem is threaded in the valve body and is movable axially between open and closed positions. With that manner of operation, no transverse passage is required in the valve stem.

The valve body 50 is axially bored at 52, the bore being counterbored and threaded at 54. Two transverse passages 58 communicate between spaced portions of the main bore 52 and the interior of the conduit formations 56. The latter may be identical with formations 16 of FIG. 1, and are typically provided with suitable means for connecting any desired type of chemical apparatus. The valve body may be externally threaded coaxially of bore 52, as at 53, to receive an apertured support member 57 and clamp nut 55.

The valve spindle 60 carries a handle 61 and is threaded at 62 over a portion of its length to engage threads 54 of the body. The end portion of the spindle is smooth and forms the coaxial stem 64 which is fittingly received in the smooth bore 52 of the body. The end of stem 64 is preferably somewhat rounded as shown. Stem 64 is preferably of such length that when the threads have bottomed out on the relatively large annular surface 67 the stem end 66 is well below passages 58 but still spaced from the bottom of bore 52, forming therewith the chamber 68. Reverse rotation of the spindle lifts the stem end above passages 58, as indicated in dotted lines at 69, providing free communication between them through the enlarged chamber 68. However, that chamber remains sealed from the outside by the close fit of stem 64 in bore 52 between the transverse passages and the counterbored portion 54.

In accordance with the present invention, the entire unitary valve body and the valve stem are formed of the same solid polymerized material having substantially the physical and chemical properties of Teflon and Kel-F, as already described in connection with FIGS. 1 and 2. Also, the diameter of stem 64 is made to exceed that of bore 52 by a precisely determined amount, substantially equal to 0.0003 inch. As already described in connection with FIGS. 1 and 2, that diametral excess may usually differ somewhat from that preferred value, but should not be appreciably less than 0.0002 nor appreciably more than 0.0006 inch.

The valve structure of FIG. 3 has the advantage that the threads provide precise control of the axial position of the valve stem. The valve may therefore be used as a needle valve for accurately controlling small rates of flow. However, it should be noted that the valve operates on a quite different principle from the conventional needle valve, which normally has a small conical seat against which the sharply tapered stem is forcibly pressed. As is well known, that action in a conventional needle valve often damages the valve. In the present valve structure, as in that of FIGS. 1 and 2, the entire valving action is performed by surfaces that are pressed together only by uniform forces generated by the initial dimensioning of the valve parts and the resilient properties of the material. After the valve is fully closed, further handle rotation only compresses the relatively large surface 67, which can withstand a large excess of pressure without damage. The actual valving surfaces and their action are not affected by such excess pressure. Hence faulty manipulation of the valve cannot destroy its accurate and reliable operation.

The valve of FIG. 3 has the great advantage over conventional needle valves of requiring no packing. The spindle is fully sealed by the same sealing action that performs the regular valving function, namely, the precise fit of stem 64 in bore 52. Thus, that closely fitting interaction of two cylindrical surfaces performs two distinct and useful functions.

The valves of the invention are particularly suitable for manual operation, but may be operated by any other means desired, as by mechanical, electrical or hydraulic actuators, for example. FIG. 4 represents in somewhat schematic form a valve body 70 and valve stem 72 actuated electrically in respective directions by the two solenoids 80 and 82. An armature structure 74 is fixedly mounted on valve stem 72, as by the pin 73. The solenoid windings are surrounded by core structure 84, which may be of conventional construction, the core structure and armature being of material having suitably high magnetic permeability. Energization of solenoid 80, as by closure of switch 87 to connect the source of voltage 88 between the lines 85 and 86, drives armature 76 downward, carrying stem 72 to valve closing position, as illustrated. Energization of solenoid 82, as via the lines 85 and 81, drives the armature and stem upward to the valve opening position indicated by the dotted line 75.

Many modifications may be made in the particular embodiments that have been described, without departing from the proper scope of the invention. For example, in a valve structure such as is shown in FIGS. 3 and 4, a fluid passage may communicate with bore 52 through its end face or through the lower portion of the cylindrical bore wall, so that the passage is always open to chamber 68 (FIG. 3). Communication between that passage and a passage such as 20 is then controlled by action of stem 64 in covering or uncovering the mouth of the latter passage.

I claim:

1. A valve comprising in combination a unitary valve body having therein a bore with a right circular cylindrical bore wall and at least two transverse fluid passages that open into the bore through mouths that are mutually spaced in said wall;

and a valve member that includes a right circular cylindrical stem coaxially received in the bore and movable therein between a closed position in which its cylindrical surface covers at least one of the passage mouths in fluid sealing relation and an open position exposing both the passage mouths to permit fluid flow therebetween, the opposing cylindrical faces of the stem and bore being free of lubricant;

the valve body and the stem of the valve member being formed both of the same solid polyethylene material selected from the group consisting of polymerized tetrafluoroethylene and polymerized trifluoromonochloroethylene;

the diameter of stem being larger than the diameter of the bore by an amount substantially within the range from 0.0002 to 0.0006 inclusive, the stem of the valve member being insertable in the bore and manually movable therein in complete absence of lubricant, and the opposing cylindrical faces of the stem and the bore forming a fluid tight seal in complete absence of lubricant.

2. A valve comprising in combination a unitary valve body having therein a right circular cylindrical through bore and at least two transverse fluid passages that open into the bore through mouths that are spaced from each other and from the bore ends;

and a valve member that includes a right circular cylindrical stem having a transverse through bore, the stem being coaxially received in the bore and being rotatable therein between a closed position covering both said passage mouths in fluid sealing relation and an open position exposing said passage mouths to opposite ends of the transverse stem bore to permit fluid flow therebetween, the opposing cylindrical faces of the stem and bore being free of lubricant;

the valve body and the stem of the valve member being formed both of the same solid polyethylene material selected from the group consisting of polymerized tetrafluoroethylene and polymerized trifluoromonochloroethylene;

the diameter of the stem being larger than the diameter of the bore by an amount substantially within the range from 0.0002 to 0.0006 inclusive, the stem of the valve member being insertable in the bore and manually movable therein in complete absence of lubricant, and the opposing cylindrical faces of the stem and the bore forming a fluid tight seal in complete absence of lubricant.

3. A valve comprising in combination a unitary valve body having therein a bore that includes an outer threaded portion and an inner coaxial right circular cylindrical working portion, and having at least two transverse fluid passages that open into the cylindrical working portion of the bore through mouths that are spaced from each other;

and a valve member that includes a threaded portion adapted to engage the threads of the bore and a coaxial right circular cylindrical stem adapted to fittingly enter the working portion of the bore, the stem being axially movable therein in response to rotation between a closed position covering at least one of said passage mouths in fluid sealing relation and an open position terminating outward of the passage mouths and closing the working portion of the bore outward thereof in fluid sealing relation, the opposing cylindrical faces of the stem and bore being free of lubricant;

the valve body and stem being formed both of the same solid polymerized material selected from the group consisting of polymerized tetrafluoroethylene and polymerized trifluoromonochloroethylene;

the diameter of the stem being larger than the diameter of the bore by an amount substantially within the range from 0.0002 to 0.0006 inclusive, the stem of the valve member being insertable in the bore and manually movable therein in complete absence of lubricant, and the opposing cylindrical faces of the stem and the bore forming a fluid tight seal in complete absence of lubricant.

4. A valve comprising in combination a unitary valve body having therein a right circular cylindrical bore and at least two transverse fluid passages that open into the bore through mouths that are spaced from each other;

a valve member that includes a right circular cylindrical stem coaxially received in the bore, the opposing cylindrical faces of the stem and bore being free of lubricant;

the valve body and stem being formed both of the same solid polymerized material selected from the group consisting of polymerized tetrafluoroethylene and polymerized trifluoromonochloroethylene;

the diameter of the stem being larger than the diameter of the bore by an amount substantially within the range from 0.0002 to 0.0006 inch, inclusive, the valve stem being insertable in the bore and movable therein in complete absence of lubricant;

and means for moving the stem axially of the bore between a closed position covering both said passage mouths in fluid sealing relation and an open position terminating outward of the passage mouths and closing the bore outward thereof in fluid sealing relation.

References Cited in the file of this patent

UNITED STATES PATENTS

| | | |
|---|---|---|
| 586,650 | Woodbury | July 20, 1897 |
| 2,833,512 | Sanborn | May 6, 1958 |
| 2,854,027 | Kaiser et al. | Sept. 30, 1958 |
| 2,865,596 | Monnig | Dec. 23, 1958 |
| 2,961,214 | Freed | Nov. 22, 1960 |
| 3,041,036 | McFarland | June 26, 1962 |